United States Patent
Doherty et al.

(10) Patent No.: US 11,491,442 B2
(45) Date of Patent: Nov. 8, 2022

(54) AIR SEPARATION MODULES AND METHODS OF REMOVING CONDENSATE FROM AIR SEPARATION MODULES

(71) Applicant: Hamilton Sundstrand Corporation, Charlotte, NC (US)

(72) Inventors: James R. Doherty, Feeding Hills, MA (US); Beakal T. Woldemariam, South Windsor, CT (US); Donald E. Army, Enfield, CT (US); David Anderson, Enfield, CT (US); Eric Surawski, Hebron, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 110 days.

(21) Appl. No.: 16/710,783

(22) Filed: Dec. 11, 2019

(65) Prior Publication Data

US 2021/0178320 A1 Jun. 17, 2021

(51) Int. Cl.
*B01D 53/26* (2006.01)
*B01D 46/00* (2022.01)
(Continued)

(52) U.S. Cl.
CPC ....... *B01D 53/265* (2013.01); *B01D 46/0031* (2013.01); *B01D 53/229* (2013.01);
(Continued)

(58) Field of Classification Search
None
See application file for complete search history.

(56) References Cited

U.S. PATENT DOCUMENTS

| 3,796,026 A | 3/1974 | Mugford |
| 3,832,830 A | 9/1974 | Gerow |

(Continued)

FOREIGN PATENT DOCUMENTS

| CN | 106268335 A | 1/2017 |
| EP | 3020467 A1 | 5/2016 |

(Continued)

OTHER PUBLICATIONS

European Search Report for Application No. 20213190.0, dated Apr. 30, 2021, 107 pages.

(Continued)

*Primary Examiner* — Jason M Greene
(74) *Attorney, Agent, or Firm* — Cantor Colburn LLP

(57) ABSTRACT

An air separation module includes a cylindrical canister and a separator. The cylindrical canister has a longitudinal axis, an inlet, an oxygen-depleted air outlet, and a drain portion with an oxygen-enriched air outlet. The separator is arranged within the cylindrical canister to separate a compressed air flow into an oxygen-depleted air flow fraction and an oxygen-enriched air flow fraction, the oxygen-depleted air flow fraction provided to the oxygen-depleted air outlet and the oxygen-enriched air flow fraction to the drain portion of the canister. The drain portion extends tangentially from the cylindrical canister to issue the oxygen-enriched air flow fraction with entrained condensate from the oxygen-enriched air outlet with a tangential flow component. Nitrogen generation systems and methods of removing condensate from air separation modules are also described.

18 Claims, 4 Drawing Sheets

(51) Int. Cl.
*B01D 53/22* (2006.01)
*B64D 37/32* (2006.01)
*C01B 21/04* (2006.01)

(52) U.S. Cl.
CPC .......... *B64D 37/32* (2013.01); *C01B 21/0438* (2013.01); *B01D 2053/224* (2013.01)

(56) References Cited

U.S. PATENT DOCUMENTS

| | | | |
|---|---|---|---|
| 5,410,999 | A | 5/1995 | Gillespie et al. |
| 8,110,027 | B2 | 2/2012 | Beeson |
| 8,361,181 | B2 | 1/2013 | Osendorf et al. |
| 8,979,983 | B2 | 3/2015 | Eowsakul |
| 9,452,381 | B2 | 9/2016 | Peacos, III et al. |
| 9,700,828 | B2 | 7/2017 | Moredock et al. |
| 9,802,159 | B2 | 10/2017 | Rekow et al. |
| 9,855,544 | B2 | 1/2018 | Peacos, III et al. |
| 9,925,497 | B2 | 3/2018 | Daniello |
| 9,932,125 | B2 | 4/2018 | McAuliffe et al. |
| 9,932,234 | B2 | 4/2018 | Daniello |
| 2006/0201872 | A1 | 9/2006 | Fall et al. |
| 2008/0190082 | A1 | 8/2008 | Scott et al. |
| 2010/0024649 | A1 | 2/2010 | Semmere et al. |
| 2012/0304856 | A1 | 12/2012 | Kanetskuki et al. |
| 2012/0312162 | A1* | 12/2012 | Theodore ............... B01D 63/02 95/47 |
| 2014/0331857 | A1* | 11/2014 | Massey .................. B64D 37/32 95/8 |
| 2014/0360373 | A1 | 12/2014 | Peacos et al. |
| 2015/0196871 | A1 | 7/2015 | Komiya et al. |
| 2016/0136570 | A1 | 5/2016 | McAuliffe et al. |
| 2016/0184761 | A1 | 6/2016 | Peacos, III et al. |
| 2016/0184793 | A1 | 6/2016 | Peacos, III et al. |
| 2016/0243496 | A1 | 8/2016 | Roussn-Bouchard et al. |
| 2017/0074699 | A1 | 3/2017 | Mullin et al. |
| 2018/0087698 | A1 | 3/2018 | Lenn et al. |
| 2018/0250625 | A1 | 9/2018 | Pflueger |
| 2019/0336668 | A1* | 11/2019 | Gyoten .................. B01D 63/02 |
| 2021/0178301 | A1 | 6/2021 | Doherty et al. |
| 2021/0178302 | A1 | 6/2021 | Doherty et al. |
| 2021/0178314 | A1 | 6/2021 | Doherty et al. |
| 2021/0178315 | A1 | 6/2021 | Doherty et al. |

FOREIGN PATENT DOCUMENTS

| | | |
|---|---|---|
| EP | 3040278 A1 | 7/2016 |
| EP | 3574937 A1 | 12/2019 |
| EP | 2717998 B1 | 9/2020 |
| GB | 2533585 A | 6/2016 |
| KR | 20180049598 A | 5/2018 |
| KR | 101863855 B1 | 6/2018 |
| WO | 02090823 A1 | 11/2002 |
| WO | 2013079466 A2 | 6/2013 |
| WO | 2017106644 A1 | 6/2017 |

OTHER PUBLICATIONS

European Office Action; European Application No. 20213190.0; dated Jan. 7, 2022; 6 pages.
European Search Report for Application No. 20209734.1, dated May 11, 2021, 52 pages.
European Search Report for Application No. 20209888.5, dated May 11, 2021, 85 pages.
European Search Report for Application No. 20213504.2, dated May 3, 2021, 108 pages.
European Search Report for Application No. 20213555.4, dated May 6, 2021, 155 pages.
Piquet Bruno: "Jul. 2009 Flight Air Worthiness", Jul. 31, 2009 (Jul. 31, 2009), pp. 1-36.
US Final Office Action for U.S. Appl. No. 16/710,795, dated Jun. 17, 2022, 52 pages.
US Non-Final Office Action for U.S. Appl. No. 16/710,773, dated Oct. 28, 2021, 20 pages.
US Non-Final Office Action for U.S. Appl. No. 16/710,795, dated Feb. 8, 2022, 36 pages.
US Notice of Allowance for U.S. Appl. No. 16/710,773, dated Feb. 23, 2022, 8 pages.
US Restriction Requirement for U.S. Appl. No. 16/710,795, dated Oct. 13, 2021, 7 pages.

* cited by examiner under control of the flow control valve such that the oxygen-enriched air flow fraction issued from the oxygen-enriched air outlet has a tangential flow component.

AIR SEPARATION MODULES AND METHODS OF REMOVING CONDENSATE FROM AIR SEPARATION MODULES

BACKGROUND

The present disclosure generally relates to nitrogen generation systems, and more particularly to removing condensate from air separation modules in nitrogen generation systems.

Vehicles, such as aircraft, commonly carry liquid fuel in fuel tanks. Fuel tanks typically have an ullage space occupied by a mixture of fuel vapors and ambient air. Such fuel vapor-air mixtures are potentially hazardous when concentration of oxygen is sufficient to support combustion. To limit (or eliminate entirely) the combustion risk posed by such fuel vapor-air mixtures some vehicles employ inerting systems to control oxygen concentration with the vehicle fuel tank. Examples of inerting systems include nitrogen generation systems with air separation modules. The air separation modules in such inerting system can be employed to communicate oxygen-depleted air flows to the vehicle fuel tank to limit oxygen concentration within the fuel tank ullage space.

Air separation modules typically separate pressurized air into an oxygen-depleted fraction and an oxygen-enriched fraction. The oxygen-depleted air flow is generally communicated to the vehicle fuel tank, wherein the oxygen-depleted air flow limits concentration of oxygen. The oxygen-enriched air flow is typically diverted to the environment external through a radially-extending outlet and external drain line, typically in the company of condensate, to an overboard drain. In some vehicles the external drain line occupies space that would, absent the external drain line, be available for the air separation module, the external drain line thereby limiting the oxygen-depleted air flow generating capacity of the air separation module and nitrogen generation system.

Such systems and methods have generally been acceptable for their intended purpose. However, there remains a need for improved air separation modules, nitrogen generation systems, and methods of removing condensate from air separation modules.

BRIEF DESCRIPTION

An air separation module is provided. The air separation module includes a cylindrical canister and a separator. The cylindrical canister has a longitudinal axis, an inlet, an oxygen-depleted air outlet, and a drain portion with an oxygen-enriched air outlet. The separator is arranged within the cylindrical canister to separate a compressed air flow into an oxygen-depleted air flow fraction and an oxygen-enriched air flow fraction, the oxygen-depleted air flow fraction provided to the oxygen-depleted air outlet and the oxygen-enriched air flow fraction to the drain portion of the cylindrical canister. The drain portion extends tangentially from the cylindrical canister to issue the oxygen-enriched air flow fraction from the oxygen-enriched air outlet with a tangential flow component.

In addition to one or more of the features described above, or as an alternative, further embodiments of the air separation module may include that the drain portion defines the oxygen-enriched air outlet, wherein the oxygen-enriched air outlet is tangentially offset from an outer surface of the cylindrical canister.

In addition to one or more of the features described above, or as an alternative, further embodiments of the air separation module may include that the cylindrical canister has a sump portion, the sump portion fluidly coupling the drain portion to the cylindrical canister.

In addition to one or more of the features described above, or as an alternative, further embodiments of the air separation module may include that the sump portion extends radially from the outer surface of the cylindrical canister.

In addition to one or more of the features described above, or as an alternative, further embodiments of the air separation module may include that the sump portion extends through the cylindrical canister and is in fluid communication with the separator.

In addition to one or more of the features described above, or as an alternative, further embodiments of the air separation module may include that the drain portion is arranged below the outer surface of the cylindrical canister relative to gravity.

In addition to one or more of the features described above, or as an alternative, further embodiments of the air separation module may include that the cylindrical canister has a first end and a second end, wherein the drain portion is unevenly spaced between the first end of the cylindrical canister and the second end of the cylindrical canister.

In addition to one or more of the features described above, or as an alternative, further embodiments of the air separation module may include a filter module connected to the first end of the cylindrical canister and fluidly coupled to the second end of the cylindrical canister by the separator, wherein is the drain portion is adjacent to the first end of the cylindrical canister.

In addition to one or more of the features described above, or as an alternative, further embodiments of the air separation module may include a flow control valve connected to the second end of the cylindrical canister and fluidly coupled to the first end of the cylindrical canister by the separator, the drain portion spaced apart from the first end of the cylindrical canister.

In addition to one or more of the features described above, or as an alternative, further embodiments of the air separation module may include that the drain portion of the cylindrical canister is spaced apart from the first end of the cylindrical canister by a first distance, the drain portion of the cylindrical canister is spaced apart from the second end of the cylindrical canister by a second distance, and that the second distance is greater than the first distance.

In addition to one or more of the features described above, or as an alternative, further embodiments of the air separation module may include a compressed air source in fluid communication with the separator through the cylindrical canister.

In addition to one or more of the features described above, or as an alternative, further embodiments of the air separation module may include a fuel tank in fluid communication with the separator through the cylindrical canister.

In addition to one or more of the features described above, or as an alternative, further embodiments of the air separation module may include a bracket fixing the air separation module to an aircraft such that the air separation module is inclined relative to the aircraft in straight and level flight.

A nitrogen generation system is also provided. The nitrogen generation system includes an air separation module as described above, the drain portion defining the oxygen-enriched air outlet, the oxygen-enriched air outlet tangentially offset from an outer surface of the cylindrical canister, the cylindrical canister has a first end and a second end, and the drain portion being unevenly spaced between the first end of the cylindrical canister and the second end of the cylindrical canister.

In addition to one or more of the features described above, or as an alternative, further embodiments of the nitrogen generation system may include a filter module connected to the first end of the cylindrical canister and fluidly coupled to the second end of the cylindrical canister by the separator, the drain portion adjacent to the first end of the cylindrical canister; and a flow control valve connected to the second end of the cylindrical canister and fluidly coupled to the first end of the cylindrical canister by the separator, the drain portion spaced apart from the first end of the cylindrical canister.

In addition to one or more of the features described above, or as an alternative, further embodiments of the nitrogen generation system may include a compressed air source in fluid communication with the separator through the cylindrical canister; and a fuel tank in fluid communication with the separator through the cylindrical canister, the cylindrical canister fluidly coupling the compressed air source to the fuel tank.

In addition to one or more of the features described above, or as an alternative, further embodiments of the nitrogen generation system may include that the cylindrical canister has a sump portion, the sump portion fluidly coupling the drain portion of the cylindrical canister to the separator and the drain portion arranged below the outer surface of the cylindrical canister relative to gravity.

A method of removing condensate from an air separation module is additionally provided. The method includes, at an air separation module as described above, receiving a compressed air flow at the cylindrical canister, separating the compressed air flow into an oxygen-enriched air flow fraction and an oxygen-depleted air flow fraction, and issuing the oxygen-enriched air flow fraction from the drain portion with a tangential flow component.

In addition to one or more of the features described above, or as an alternative, further embodiments of the method may include condensing moisture entrained in the compressed air flow into a condensate within the cylindrical canister and ejecting the condensate from the cylindrical canister with the oxygen-enriched air flow fraction issued from the drain portion of the cylindrical canister.

In addition to one or more of the features described above, or as an alternative, further embodiments of the method may include communicating the oxygen-depleted air flow fraction to a fuel tank.

Technical effects of the present disclosure include air separation modules having relatively large oxygen-depleted air flow generating capacity (inerting capability) relative to space occupied by the air separation module. In certain examples air separation modules described herein have drain portion extending tangentially from the air separation module canister to divert oxygen-enriched air and condensate from the oxygen-depleted air flow. In accordance with certain examples the drain portion is arranged along the lower portion of the canister relative to gravity, allowing the oxygen-enriched air flow to drive the condensate from the canister. It is also contemplated that, in accordance with certain examples, that the drain portion be unevenly spaced between end of the canister, reducing pressure drop across the canister.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
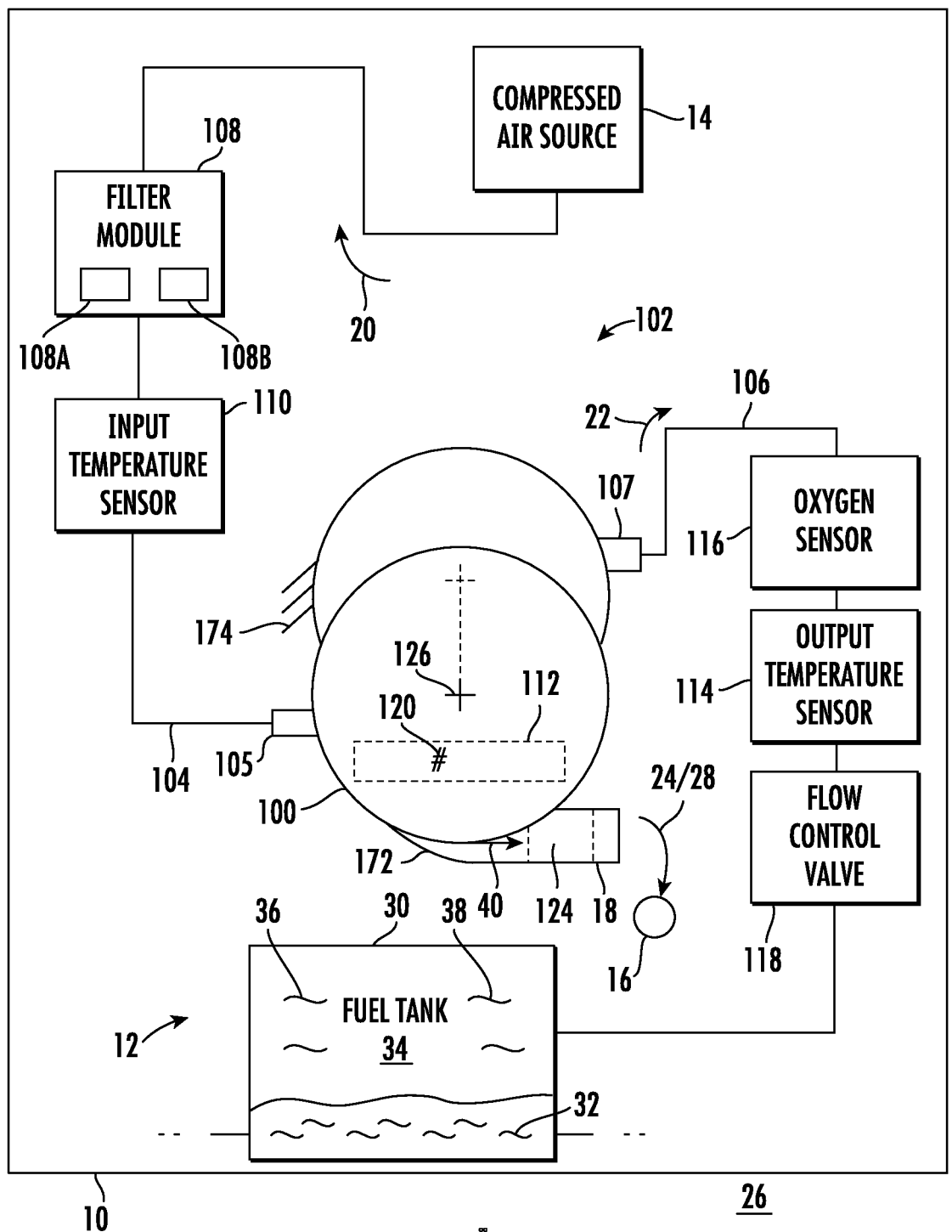
FIG. 1 is a schematic view of a nitrogen generation system including an air separation module constructed in accordance with the present disclosure, showing a tangentially extending drain portion fluidly coupled to a separator within a cylindrical canister of the air separation module.

Reference will now be made to the drawings wherein like reference numerals identify similar structural features or aspects of the subject disclosure. For purposes of explanation and illustration, and not limitation, a partial view of an example of an air separation module constructed in accordance with the disclosure is shown in FIG. 1 and is designated generally by reference character 100. Other embodiments of air separation modules, nitrogen generation systems, and methods of removing condensate from air separation modules are provided in FIGS. 2-4, as will be described. The systems and methods described herein can be used for inerting storage vessels containing combustible materials, such as fuel tanks carried by vehicles like aircraft, though the present disclosure is not limited to vehicles or to fuel tanks in general.

Referring to FIG. 1, a vehicle 10, e.g., an aircraft is shown. The vehicle 10 includes a fuel system 12, a compressed air source 14, and a nitrogen generation system 102. The vehicle 10 also includes an overboard drain 16 and an overboard drain conduit 18.

The fuel system 12 includes a fuel tank 30. The fuel tank 30 is fluidly coupled to the air separation module 100 by the supply conduit 106, contains therein a liquid fuel 32, and defines within it interior an ullage space 34. The ullage space 34 harbors an atmosphere including fuel vapor 36 and oxygen-depleted air 38, e.g., nitrogen-enriched air. It is contemplated that the oxygen-depleted air 38 be received from the air separation module 100 via the oxygen-depleted air flow fraction 22, e.g., a nitrogen-enriched air flow fraction. It is also contemplated that the oxygen-depleted air 38 within the ullage space 34 of the fuel tank 30 be sufficient to limit concentration of oxygen within the ullage space 34 to concentrations below that capable of supporting combustion of the fuel vapor 36. This limits (or prevents entirely) possibility of combustion of the fuel vapor 36 in the event that an ignition source comes into communication with the fuel vapor 36.

The compressed air source 14 is configured to provide a compressed air flow 20 (or pressurized air flow) to the nitrogen generation system 102. In this respect the compressed air source 14 communicates the compressed air flow 20 to the air separation module 100 via the source conduit 104. In certain examples the compressed air source 14 includes a gas turbine engine, such as an aircraft or an auxiliary power unit carried by an aircraft. In accordance with certain examples the compressed air source 14 includes a ground cart mounting a compressor device.

The nitrogen generation system 102 includes the air separation module 100, a source conduit 104, and a supply conduit 106. The source conduit 104 fluidly connects the compressed air source 14 to the air separation module 100. The supply conduit 106 fluidly connects the air separation module 100 to the fuel system 12. In certain examples the nitrogen generation system 102 is an onboard inert gas generation system (OBIGGS) for an aircraft.

The air separation module 100 includes a filter module 108 containing a debris filter 108A and an ozone converter 108B, an inlet temperature sensor 110, and a separator 112. The air separation module 100 also includes an outlet temperature sensor 114, an oxygen sensor 116, and a flow control valve 118.

The debris filter 108A contained within the filter module 108 is configured to filter entrained debris from the compressed air flow 20 to prevent entrained debris from reaching and/or reducing reliability of the separator 112. The ozone converter 108B contained within the filter module 108 is also configured to convert ozone molecules entrained within the compressed air flow 20 into dioxygen molecules, preventing the entrained ozone molecules from reaching and/or reducing reliability of the separator 112. In this respect the filter module 108 is in fluidly coupled to the source conduit 104 and is in fluid communication with the inlet temperature sensor 110 to communicate thereto the compressed air flow 20 absent debris and ozone entrained within the compressed air flow 20 provided by the compressed air source 14.

The inlet temperature sensor 110 is configured to measure temperature of the compressed air flow 20 provided to the separator 112. In this respect the inlet temperature sensor 110 is fluidly coupled to the filter module 108 to receive therefrom the compressed air flow 20 and is also fluidly coupled to the separator 112 to communicate thereto the compressed air flow 20. In certain examples the inlet temperature sensor 110 is disposed in communication with a controller, which adjusts temperature of the compressed air flow 20 to maintain the compressed air flow 20 within a predetermined inlet temperature range.

The separator 112 is configured to separate the compressed air flow 20 into an oxygen-depleted air flow fraction 22 and an oxygen-enriched air flow fraction 24. The air separation module 100 diverts the oxygen-enriched air flow fraction 24 from the fuel system 12. More specifically, the oxygen-enriched air flow fraction 24 is routed to the overboard drain 16 through the overboard drain conduit 18. The overboard drain 16 in turn communicates the oxygen-enriched air flow fraction 24 to the external environment 26 outside the vehicle 10, e.g., by dumping overboard the oxygen enriched air flow fraction 24 overboard. In certain examples the oxygen-enriched air flow fraction 24 also drives a condensate 28, accumulated from moisture entrained within the compressed air flow 20 and condensed within the air separation module 100, to the overboard drain 16.

The air separation module 100 provides the oxygen-depleted air flow fraction 22 to the fuel system 12. More specifically, the air separation module 100 communicates the oxygen-depleted air flow fraction 22 to supply conduit 106 via the outlet temperature sensor 114, the oxygen sensor 116, and the flow control valve 118. In this respect the separator 112 is fluidly coupled to the inlet temperature sensor 110 to receive therefrom the compressed air flow 20 and includes a fiber membrane 120. The fiber membrane 120 is operative to separate the compressed air flow 20 into the oxygen-enriched air flow fraction 24 and the oxygen-depleted air flow fraction 22 according to molecule size. The fiber membrane 120 and shunts the oxygen-enriched air flow fraction 24 and communicates the oxygen-depleted air flow fraction 22 to the outlet temperature sensor 114. In certain examples the separator 112 includes a hollow fiber mat. Examples of suitable hollow fiber mats include PEEK-Sep™ hollow fiber mats, available from Air Liquide Advanced Separations of Woburn, Mass.

The outlet temperature sensor 114 is configured to measure temperature of the oxygen-depleted air flow fraction 22 prior to the oxygen-depleted air flow fraction 22 reaching the fuel system 12. In this respect the outlet temperature sensor 114 is fluidly coupled between the oxygen sensor 116 and the flow control valve 118 to measure temperature of the oxygen-depleted air flow fraction 22 from the separator 112 as the oxygen-depleted air flow fraction 22 traverses the air separation module 100. It is contemplated the outlet temperature sensor 114 provide a signal to a controller indicative of temperature of the oxygen-depleted air flow fraction 22, the controller thereby able to control of the oxygen-depleted air flow fraction 22 communicated to the fuel system 12.

The oxygen sensor 116 is configured to measure concentration of oxygen within the oxygen-depleted air flow fraction 22 prior to the oxygen-depleted air flow fraction 22 reaching the fuel system 12. In this respect the oxygen sensor 116 is fluidly coupled between the outlet temperature sensor 114 and the supply conduit 106 to measure oxygen concentration within the oxygen-depleted air flow fraction 22 received from the separator 112 as the oxygen-depleted air flow fraction 22 traverses the air separation module 100. It is contemplated that the oxygen sensor 116 provide a signal to a controller indicative of oxygen concentration within the oxygen-depleted air flow fraction 22, the controller thereby able to monitor performance of the air separation module 100.

The flow control valve 118 is configured to control flow rate, e.g., mass flow rate, of the oxygen-depleted air flow fraction 22 to the supply conduit 106. In this respect the flow control valve 118 is fluidly coupled between the oxygen sensor 116 and the supply conduit 106 to throttle flow of the oxygen-depleted air flow fraction 22 provided by the separator 112. It is contemplated that the flow control valve 118 be operatively associated with a controller to throttle the flow rate of the oxygen-depleted air flow fraction 22 according to the inerting requirements of the fuel system 12 and/or according to the operating requirements of the vehicle 10.

As will be appreciated by those of skill in the art in view of the present disclosure, the installation space available for air separation modules on certain vehicles can limit the size and capacity of the air separation module. To increase the capacity of the air separation module 100 per unit volume of installation space the air separation module 100 includes a cylindrical canister 122 having a drain portion 124. The drain portion 124 extends tangentially from of the cylindrical canister 122 to issue the oxygen-enriched air flow fraction 24 from the drain portion 124 with a tangential flow component 40. The tangential extent of the drain portion 124 limits size (or eliminates entirely) the need for the overboard drain conduit 18 while allowing the air separation module 100 to connect to the overboard drain 16. The limited size (or omission) of the overboard drain conduit 18 enables the air separation module 100 to have relatively high capacity in relation to an arrangement where the drain portion radially from the cylindrical canister, e.g., by allowing the cylindrical canister to have a relatively large diameter. In certain examples the cylindrical canister 122 can have a diameter of nine (9) inches (about 23 centimeters), tripling the capacity of the air separation module in relation to air separation modules having canisters of five (5) inches (about 14 centimeters). Although shown and described herein as having a cylindrical canister 122, air separation modules having canisters with rounded or curved shapes can also benefit from the present disclosure.

Figure 2:
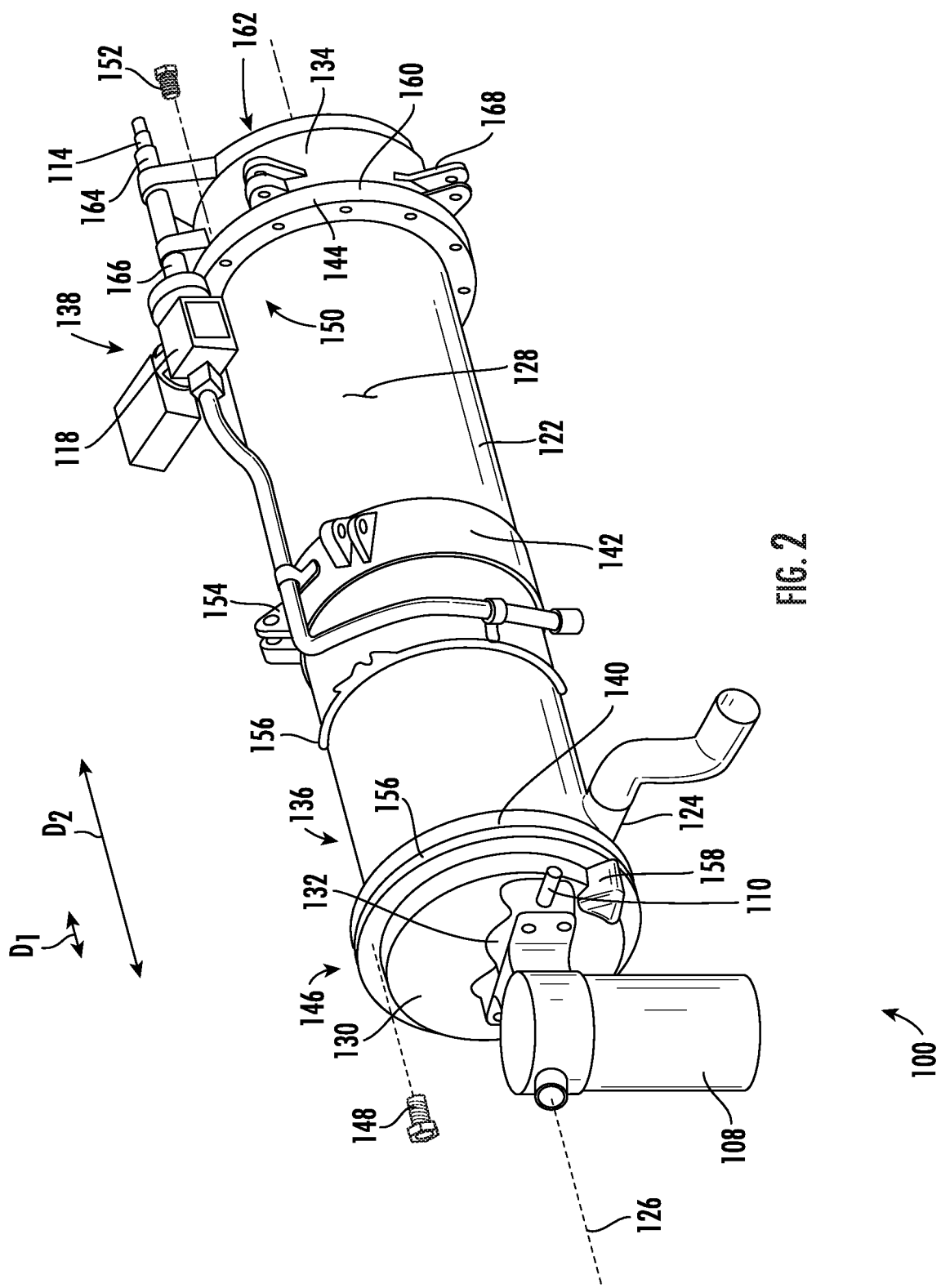
FIG. 2 is a perspective view of the air separation module of FIG. 1 according to an example, showing the cylindrical canister connecting a first end cap with a filter module to a second end cap having a flow control valve with the drain portion arranged between the first end cap and the second end cap.

With reference to FIG. 2, the air separation module 100 is shown according to an example. The air separation module 100 generally includes the separator 112 and the cylindrical canister 122. The cylindrical canister 122 has a longitudinal axis 126, an inlet 105 (shown in FIG. 1), an oxygen-depleted air outlet 107 (shown in FIG. 1), and the drain portion 124 with an oxygen-enriched air outlet 170. The separator 112 is arranged within the cylindrical canister 122 to separate the compressed air flow 20 (shown in FIG. 1) into the oxygen-depleted air flow fraction 22 and an oxygen-enriched air flow fraction 24 (shown in FIG. 1), the oxygen-depleted air flow fraction 22 provided to the oxygen-depleted air outlet 107 and the oxygen-enriched air flow fraction 24 to the drain portion 124 of the cylindrical canister 122. The drain portion 124 of the cylindrical canister 122 extends tangentially from the cylindrical canister 122 to issue the oxygen-enriched air flow fraction 24 from the oxygen-enriched air outlet 170 with the tangential flow component 40 (shown in FIG. 1).

The separator 112 is arranged along a longitudinal axis 126 to separate the compressed air flow 20 (shown in FIG. 1) into the oxygen-depleted air flow fraction 22 (shown in FIG. 1) and the oxygen-enriched air flow fraction 24 (shown in FIG. 1). The cylindrical canister 122 contains the separator 112 has an outer surface 128 extending about the longitudinal axis 126 and the drain portion 124. The drain portion 124 extends tangentially from the outer surface 128 of the cylindrical canister 122 to issue the oxygen-enriched air flow fraction 24 (shown in FIG. 1) from drain portion 124 with the tangential flow component 40 (shown in FIG. 1).

In the illustrated example the air separation module 100 includes a first end cap 130 with a mount portion 132 and a second end cap 134. The cylindrical canister 122 extends between a first end 136 and an opposite second end 138. The separator 112 is fixed within the cylindrical canister 122 to separate the compressed air flow 20 (shown in FIG. 1) into the oxygen-enriched air flow fraction 24 (shown in FIG. 1) and the oxygen-depleted air flow fraction 22 (shown in FIG. 1). The compressed air source 14 (shown in FIG. 1) is in fluid communication with the separator 112 through the cylindrical canister 122 to provide the compressed air flow 20 (shown in FIG. 1) to the separator 112. The fuel tank 30 is in fluid communication with the separator 112 through the cylindrical canister 122 to receive therefrom the oxygen-depleted air flow fraction 22 (shown in FIG. 1).

The cylindrical canister 122 has a canister first flange 140, a canister doubler 142, and a canister second flange 144. The canister first flange 140 extends about the first end 136 of the cylindrical canister 122 and defines a canister first fastener pattern 146 to rigidly fix thereon the first end cap 130, e.g., with a plurality of first fasteners 148. The canister doubler 142 is arranged between the first end 136 and the second end 138 of the cylindrical canister 122, extends circumferentially about the cylindrical canister 122, and is formed as a thickened portion of the canister 122. The canister second flange 144 is similar to the canister first flange 140 and additionally extends about the second end 138 of the cylindrical canister 122, defines a second fastener pattern 150, and is arranged to rigidly fix thereon seat thereon a second end cap 134, e.g., with a plurality of second fasteners 152.

In certain examples a canister fixation feature 154 extends laterally from the canister doubler 142 for fixation of the cylindrical canister 122, and thereby the air separation module 100, within the vehicle 10 (shown in FIG. 1).

The drain portion 124 of the cylindrical canister 122 is arranged between the first end 136 and the second end 138 of the cylindrical canister 122. More specifically, the drain portion 124 is arranged between the canister first flange 140 and the canister second flange 144. It is contemplated that the drain portion 124 be unevenly spaced between the first end 136 and the second end 138 of the cylindrical canister 122. In the illustrated example the drain portion 124 is canister is spaced apart from the first end 136 of the cylindrical canister 122 by a first distance $D_1$, the drain portion 124 of the cylindrical canister 122 is spaced apart from the second end 138 of the cylindrical canister 122 by a second distance $D_2$, and the second distance $D_2$ is greater than the first distance $D_1$. Unevenly spacing the drain portion 124 axially along the longitudinal axis 126, e.g., closer to the first end 136 of the canister 122 and can improves the performance of the air separation module 100 by limiting pressure drop per unit mass flow rate of oxygen-depleted air flow fraction. In certain examples wherein the drain portion 124 is spaced apart from the first end 136 of the cylindrical canister 122, which allows the cylindrical canister 122 to accommodate the location of the overboard drain 16 (shown in FIG. 1) without decreasing performance of the air separation module 100, e.g., by increasing pressure drop across the air separation module 100.

The first end cap 130 includes the filter module mount 132, a first end cap flange 156, and a first end cap fixation feature 158. The first end cap flange 156 is arranged on a side of the first end cap 130 opposite the filter module mount 132 and rigidly fixes the first end cap 130 to the first end 136 of the cylindrical canister 122. More specifically, the first end cap 130 is rigidly fixed to the canister first flange 140 by the plurality of first fasteners 148. Being rigidly fixed, the filter module mount 132 supports the filter module 108 and the inlet temperature sensor 110 and provides fluid communication therethrough with the separator 112. The filter module mount 132 also fluidly couples the filter module 108 to the second end 138 of the cylindrical canister 122 by the separator 112, the drain portion 124 of the cylindrical canister 122 adjacent to the first end 136 of the cylindrical canister 122.

The second end cap 134 is similar to the first end cap 130 and has a second end cap flange 160, an oxygen sensor seat 162, an outlet temperature sensor seat 164. The second end cap 134 also has a flow control valve seat 166 and a second end cap fixation feature 168. The second end cap flange 160 rigidly fixes the second end cap 134 to the second end 138 of the cylindrical canister 122. In this respect the second end cap flange 160 abuts the canister second flange 144 and receives therethrough the plurality of second fasteners 152, which rigidity fix the second end cap 134 to the second end 138 of the cylindrical canister 122.

The oxygen sensor seat 162 seats thereon the oxygen sensor 116 (shown in FIG. 1), supports the oxygen sensor 116, and fluidly couples the oxygen sensor 116 to the compressed air source 14 (shown in FIG. 1) through the separator 112 (shown in FIG. 1). The outlet temperature sensor seat 164 seats thereon the outlet temperature sensor 114, supports the outlet temperature sensor 114, and fluidly couples the outlet temperature sensor 114 to the compressed air source 14 through the separator 112. The flow control valve seat 166 seats thereon the flow control valve 118, supports the flow control valve 118, and fluidly couples the flow control valve 118 to compressed air source 14 through the separator 112. The flow-control valve 118 is connected to the second end 138 of the cylindrical canister 122 and is fluidly coupled to the first end 136 of the cylindrical canister by the separator 112.

Figure 3:
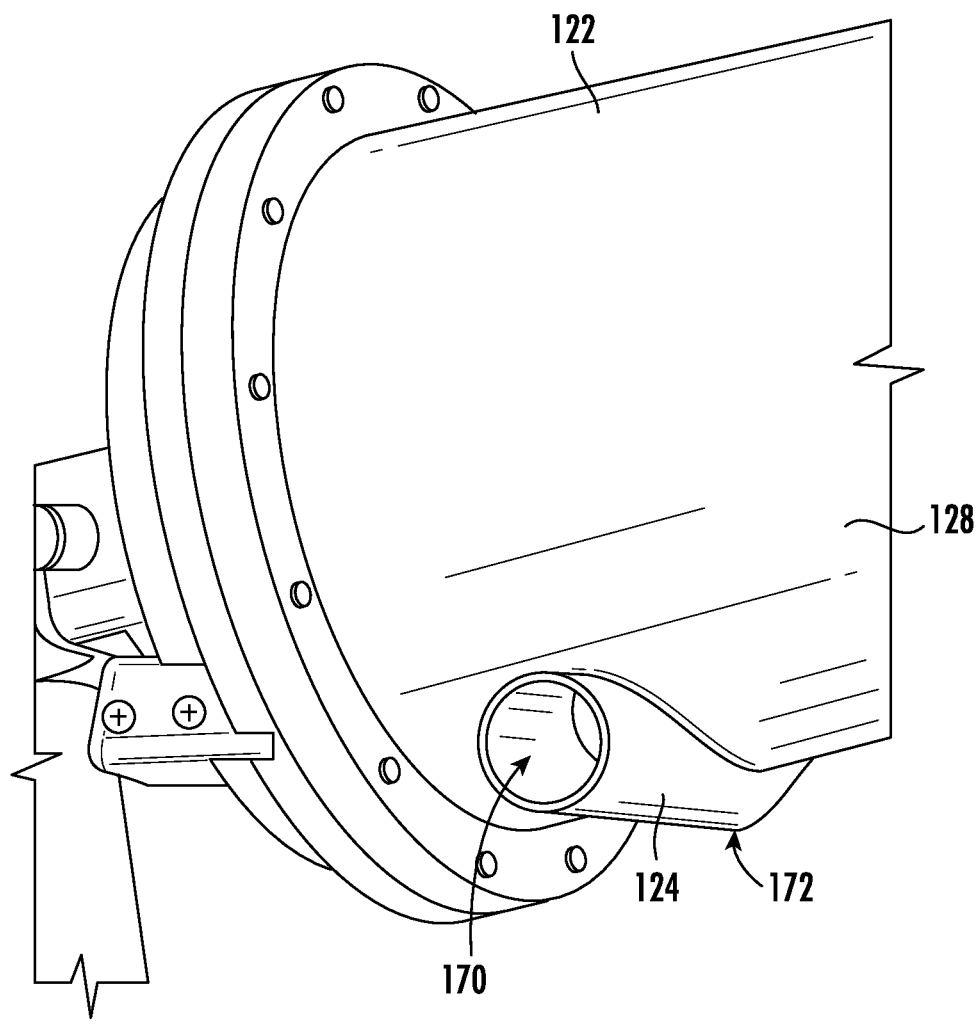
FIG. 3 is a partial perspective view of the air separation module of FIG. 1 according to the example, showing the drain portion of the cylindrical canister spaced apart from the first end cap of the air separation module.

With reference to FIG. 3, a portion of the air separation module 100 is shown including the drain portion 124 of the cylindrical canister 122. The drain portion 124 defines an oxygen-enriched air outlet 170. The oxygen-enriched air outlet 170 is tangentially offset from the outer surface 128 of the cylindrical canister 122, is fluidly coupled to the separator 112 (shown in FIG. 1) by the drain portion 124 of the cylindrical canister 122 and is arranged to interface the air separation module 100 to the overboard drain 16 (shown in FIG. 1).

The cylindrical canister 122 includes a sump portion 172. The sump portion 172 fluidly couples the drain portion 124 of the cylindrical canister 122 to the separator 112 and is arranged to collect and divert the condensate 28 (shown in FIG. 1) from within the cylindrical canister 122 to the drain portion 124 and therethrough to the overboard drain 16 (shown in FIG. 1) of the vehicle 10 (shown in FIG. 1), e.g., entrained with the oxygen-enriched air flow 24. In this respect the sump portion 172 of the canister 122 extends through the cylindrical canister 122, e.g., through the canister wall, and is fluid communication therethrough with the separator 112. In certain examples the sump portion 172 extends radially from the outer source 128 of the cylindrical canister 122. In accordance with certain examples the drain portion 124 is arranged between the outer surface 128 of the cylindrical canister 122 relative to gravity. It is also contemplated that, in certain examples, a bracket 174 (shown in FIG. 1) can fix the air separation module 100 to the vehicle 10 such that the air separation module 100 is inclined relative to the vehicle 10, e.g., an aircraft in straight and level flight, to limit the pressure required to drive the condensate 28 from the cylindrical canister 122.

Figure 4:
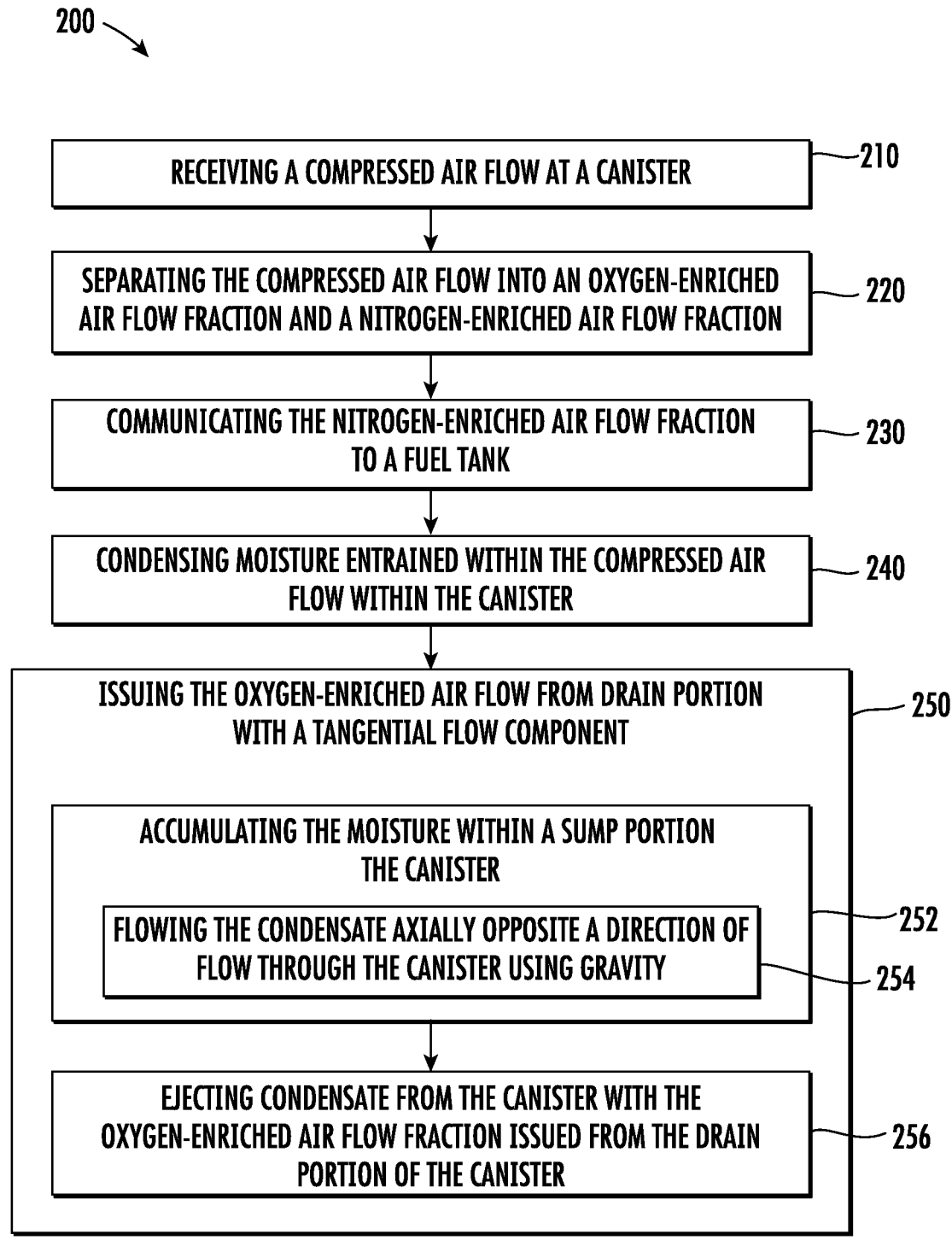
FIG. 4 is a block diagram of a method of removing condensate from an air separation module according to an illustrative and non-limiting example of the method.

With reference to FIG. 4, a method 200 of removing condensate from an air separation module, e.g., the condensate 28 (shown in FIG. 1) from the air separation module 100 (shown in FIG. 1), is shown. The method 200 includes receiving a compressed air flow at a cylindrical canister, e.g., the compressed air flow 20 (shown in FIG. 1) at the cylindrical canister 122 (shown in FIG. 1), as shown with box 210. The compressed air flow is separated into an oxygen-enriched air flow fraction, e.g., the oxygen-enriched air flow fraction 24 (shown in FIG. 1), and an oxygen-depleted air flow fraction, e.g., the oxygen-depleted air flow fraction 22 (shown in FIG. 1), as shown with box 220. The oxygen-depleted air flow fraction is communicated to a fuel tank, e.g., the fuel tank 30 (shown in FIG. 1), as shown with box 230. The oxygen-enriched air flow is issued from the air separation module through a drain portion of the cylindrical canister with a tangential flow component, e.g., through the drain portion 124 (shown in FIG. 2) with the tangential flow component 40 (shown in FIG. 2), as shown with box 250.

In certain examples the method 200 includes condensing moisture entrained in the compressed air flow within the cylindrical canister to form a condensate, e.g., the condensate 28 (shown in FIG. 2), as shown with box 240. In accordance with certain examples the condensate can accumulate within a sump portion of the cylindrical canister, e.g., the sump portion 172 (shown in FIG. 1), as shown with box 252. It is contemplated that accumulating the condensate can include flowing the condensate axially within the cylindrical canister in a direction opposite to the direction of flow through the cylindrical canister, e.g., from the first end 136 (shown in FIG. 2) to the second end 138 (shown in FIG. 2) of the cylindrical canister 122, as shown with box 254. It is also contemplated that the condensate be ejected from the cylindrical canister with (or by) the oxygen enriched air flow fraction via entrainment as the oxygen-enriched air flow fraction is issued from the cylindrical canister, as shown with box 256.

The oxygen-enriched air fraction is issued from a drain portion of the cylindrical canister, e.g., the drain portion 124 (shown in FIG. 2) of the cylindrical canister 122 (shown in FIG. 2), with a tangential flow component, e.g., the tangential flow component 40 (shown in FIG. 1), as shown with box 230. It is contemplated that the method 200 include condensing moisture entrained in the compressed air flow received by the cylindrical canister, as shown with box 240. The condensate is ejected from the cylindrical canister with the oxygen-enriched air flow fraction, as shown with box 250. In certain examples the method 200 includes communicating the oxygen-depleted air flow fraction to a fuel tank, e.g., to the fuel tank 30 (shown in FIG. 1), as shown with box 260.

Fuel tanks, such as fuel tanks used to store liquid fuel in vehicles like aircraft, commonly contain fuel vapors within the fuel tank ullage space. Because fuel vapors can combust when oxygen is present within the ullage space in concentrations sufficient to support combustion, some vehicles include nitrogen generation systems. Nitrogen generation systems generally provide the capability to communicate an oxygen-depleted air flow to the vehicle fuel tank, typically using an air separation module. The air separation module receives a flow of pressurized air from the ambient environment, separates the ambient air into an oxygen-depleted air flow and an oxygen-enriched air flow. The oxygen-depleted air flow is communicated to the fuel tank by the nitrogen generation system while the oxygen-enriched air is diverted from the fuel tank, typically by issuing the oxygen-enriched air flow radially from the air separation module canister.

In examples provided herein air separation modules include canisters with tangential drain portions extending tangentially from the outer surface of the canister, the canister thereby conforming to a predetermined installation space and outlet alignment in relative to the vehicle overboard drain. In certain examples the tangential drain portion allows flexibility of the location of the drain at the lowest point of the canister while allowing the drain output to connect the vehicle overboard drain. In accordance with certain examples the tangential drain portion is arranged on the bottom of the canister, the drain portion thereby serving as a condensate sump and facilitating removal of condensate from the air separation module with the oxygen-enriched air flow fraction. It is also contemplated that, in accordance with certain examples, that the drain portion be unevenly spaced between the ends of the canister to limit pressure drop across the air separation module. radially from the canister of the air separation module.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air separation module, comprising:
a cylindrical canister having a longitudinal axis, an inlet, an oxygen-depleted air outlet, and a drain portion with an oxygen-enriched air outlet;
a separator arranged within the cylindrical canister to separate a compressed air flow into an oxygen-depleted air flow fraction and an oxygen-enriched air flow fraction, the oxygen-depleted air flow fraction provided to the oxygen-depleted air outlet and the oxygen-enriched air flow fraction to the drain portion of the canister; and
a sump portion fluidly coupling the drain portion to the cylindrical canister, wherein a first end of the sump portion is arranged within the cylindrical canister and the sump portion extends radially from an outer surface of the cylindrical canister, and the drain portion is connected to a second, opposite end of the sump portion;
wherein the drain portion extends tangentially from the cylindrical canister to issue the oxygen-enriched air flow fraction and entrained condensate from the oxygen-enriched air outlet with a tangential flow component.

2. The air separation module of claim 1, wherein the drain portion defines the oxygen-enriched air outlet, wherein the oxygen-enriched air outlet is tangentially offset from an outer surface of the cylindrical canister.

3. The air separation module of claim 1, wherein the sump portion extends through the cylindrical canister and is in fluid communication with the separator.

4. The air separation module of claim 1, wherein the drain portion is arranged below the outer surface of the cylindrical canister relative to gravity.

5. The air separation module of claim 1, wherein the cylindrical canister has a first end and a second end, wherein the drain portion is unevenly spaced between the first end of the cylindrical canister and the second end of the cylindrical canister.

6. The air separation module of the claim 5, further comprising a filter module connected to the first end of the cylindrical canister and fluidly coupled to the second end of the cylindrical canister by the separator, wherein the drain portion is adjacent to the first end of the cylindrical canister.

7. The air separation module of claim 5, further comprising a flow control valve connected to the second end of the cylindrical canister and fluidly coupled to the first end of the cylindrical canister by the separator, wherein the drain portion is spaced apart from the first end of the cylindrical canister.

8. The air separation module of claim 5, wherein the drain portion of the cylindrical canister is spaced apart from the first end of the cylindrical canister by a first distance, wherein the drain portion of the cylindrical canister is spaced apart from the second end of the cylindrical canister by a second distance, wherein the second distance is greater than the first distance.

9. The air separation module of claim 1, further comprising a compressed air source in fluid communication with the separator through the cylindrical canister.

10. The air separation module of claim 1, further comprising a fuel tank in fluid communication with the separator through the cylindrical canister.

11. The air separation module of claim 1, further comprising a bracket fixing the air separation module to an aircraft such that the air separation module is inclined relative to the aircraft in straight and level flight.

12. A nitrogen generation system, comprising:
an air separation module as recited in claim 1, wherein the drain portion defines the oxygen-enriched air outlet, wherein the oxygen-enriched air outlet is tangentially offset from an outer surface of the cylindrical canister; and
wherein the cylindrical canister has a first end and a second end, wherein the drain portion is unevenly spaced between the first end of the cylindrical canister and the second end of the cylindrical canister.

13. The nitrogen generation system of claim 12, further comprising:
a filter module connected to the first end of the cylindrical canister and fluidly coupled to the second end of the cylindrical canister by the separator, wherein is the drain portion is adjacent to the first end of the cylindrical canister; and
a flow control valve connected to the second end of the cylindrical canister and fluidly coupled to the first end of the cylindrical canister by the separator, wherein the drain portion is spaced apart from the first end of the cylindrical canister.

14. The nitrogen generation system of claim 12, further comprising:
a compressed air source in fluid communication with the separator through the cylindrical canister; and
a fuel tank in fluid communication with the separator through the cylindrical canister, the cylindrical canister fluidly coupling the compressed air source to the fuel tank.

15. The nitrogen generation system of claim 12, wherein the cylindrical canister has a sump portion, the sump portion fluidly coupling the drain portion of the cylindrical canister to the separator, wherein the drain portion is arranged below the outer surface of the cylindrical canister relative to gravity.

16. A method of removing condensate from an air separation module, comprising:
providing an air separation module including a separator arranged along a longitudinal axis and a cylindrical canister containing the separator, the cylindrical canister having an outer surface extending circumferentially about the longitudinal axis, a sump portion, and a drain portion in fluid communication with the separator via the sump portion, the sump portion being partially arranged within the cylindrical canister and extending radially from an outer surface of the cylindrical canister, and the drain portion connected to the sump portion and extending tangentially from the outer surface of the cylindrical canister;
receiving a compressed air flow at the cylindrical canister;
separating the compressed air flow into an oxygen-enriched air flow fraction and an oxygen-depleted air flow fraction; and
issuing the oxygen-enriched air flow fraction from the drain portion with a tangential flow component.

17. The method of claim 16, further comprising:
condensing moisture entrained in the compressed air flow into a condensate within the cylindrical canister; and
ejecting the condensate from the cylindrical canister with the oxygen-enriched air flow fraction issued from the drain portion of the cylindrical canister.

18. The method of claim 16, further comprising communicating the oxygen-depleted air flow fraction to a fuel tank.

* * * * *